United States Patent Office 3,224,002
Patented Dec. 14, 1965

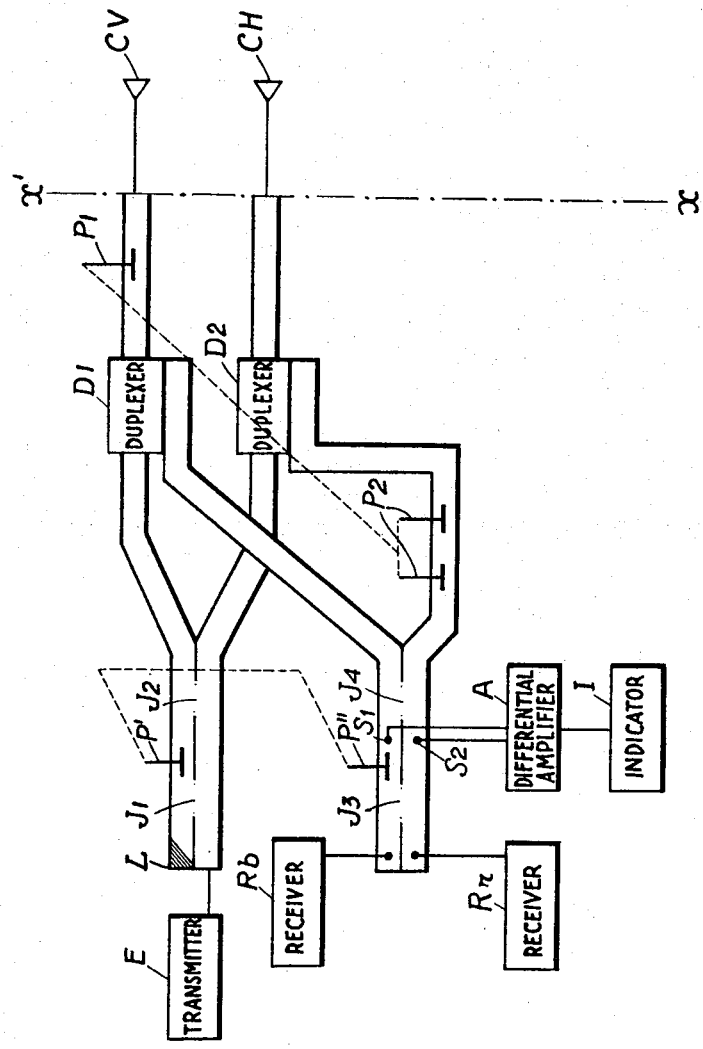

3,224,002
RADAR SYSTEMS
Roland Carré, Paris, France, assignor to C.S.F.-Compagnie Générale de Telegraphie Sans Fil, a corporation of France
Filed May 28, 1963, Ser. No. 283,910
Claims priority, application France, May 30, 1962, 899,167, Patent 1,332,066
6 Claims. (Cl. 343—18)

The present invention relates to radar systems.

The accurate detection of jammers by radar systems is generally hardly possible because the radar echoes reflected by a jammer carrier, such as, for example, an airplane, are generally drowned in the jamming signals. However, the direction of the jammer can be determined at least approximately by goniometry. In particular, the direction of the axis of the aerial system of the radar system may indicate the direction of maximum jamming reception. However, the range can of course not be determined in the same manner, nor can the targets located in the same direction as the jammer be detected.

It is an object of the invention to solve this problem. Another object of the invention is to make the determination of the direction of the jammer more accurate.

According to the invention there is provided a radar system comprising a transmit-receive channel for vertically polarized waves, a transmit-receive channel for horizontally polarized waves, a transmitter coupled to the inputs of these two channels, a first receiver and a second receiver, coupled to the outputs of these channels and a device adapted to switch to one of said receivers the jamming signals received by said two channels and to the other receiver a major or at least a substantial part of the radar signals received by said channels.

The invention will be best understood from the following description and appended diagrammatic drawing, the only figure of which illustrates a hand-controlled embodiment of the system according to the invention.

In the drawing, two 3 db hybrid junctions J1 and J2 are connected in series, the two input branches of junctions J2 serving as the two output branches of junction J1. One of the input branches of junction J1 terminates in a matched load L. A radar transmitter E, which may be, for example, of the pulse type, is connected to the other input branch of junction J1. A variable phase-shifter P', of any known type, for example of the type comprising a movable dielectric strip, is placed in that output branch of junction J1, which is in the prolongation of the input branch terminated in the matched load L. The two output branches of junction J2 feed respectively a transmit-receive channel for vertically polarized waves and a transmit-receive channel for horizontally polarized waves, the former being, for example, that coupled to that output branch of junction J2, which is in the prolongation of the input branch including phase-shifter P'. The first polarization channel comprises a duplexer D1 and a variable phase-shifter P1 which may be, for example, similar to phase-shifter P'. The output of the phase-shifter P1 feeds an antenna such as a horn CV, which transmits and receives vertically polarized signals.

The second transmit-receive channel comprises a duplexer D2, which feeds an antenna, such as a horn CH which transmits and receives horizontally polarized signals. In the drawing, the coupling elements between horns CV and CH and the outputs of phase-shifter P1 and duplexer D2, which coupling elements include for one of the horns a polarization shifter, are only symbolically represented by a wire on the right side of a dotted line $x'x$. Horns CV and CH are located adjacent to one another and a conventional mechanism imparts to them a common motion so that they simultaneously scan the same space portion. The electrical lengths of the two paths between the outputs of junction J2 and horns CV and CH respectively are equal, disregarding the phase-shift imparted by phase-shifter P2.

The receiving outputs of duplexers D1 and D2 are respectively coupled to the input branches of a 3 db hybrid junction J4. A variable phase-shifter P2 is inserted in the guide connecting duplexer D2 to the corresponding input of junction J4. This variable phase-shifter P2 is ganged with phase-shifter P1, so that the phase-shift $2p$ which it provides is always double the phase-shift $p$ provided by the phase-shifter P1. In the present example, the phase-shifter P2 comprises two phase-shifters identical to P1, located one adjacent the other. The control arrangement common to the phase-shifters P1 and P2 is shown in the drawing as a dotted line.

Disregarding the phase-shift imposed by P2, the electrical distances from duplexers D1 and D2 to the two input branches of junctions J4 are equal.

A 3 db junction J3 has its two input branches respectively in prolongation of the output branches of junction J4 and a phase-shifter P'', identical to P', is inserted in that output branch of J4 which is in prolongation of its input branch connected to duplexer D1.

Phase-shifters P' and P'' are ganged and their common control arrangement is shown as a dotted line. They provide the same phase-shift $p'$.

Probes S1 and S2 respectively located in the two output branches of junction J4, S1 being located before phase-shifter P'', are respectively connected to the two inputs of a differential amplifier A, the output of which feeds an indicator device I.

A conventional radar receiver Rr, which will be henceforth designated as the "detection receiver," and a receiver Rb, which may be identical to Rr, and will be designated as the "jammer receiver," are respectively connected to the two output branches of junction J3, this latter receiver being coupled to that branch which is located in the prolongation of the channel including the phase-shifter P''. The coupling between receivers Rb and Rr, amplifier A, indicator I and the corresponding junctions may be, for example, through coaxial cables.

The described system operates as follows:

When no energy is transmitted by transmitter E, phase-shifter P1 being adjusted to provide a random phase-shift $p$, and phase-shifter P2 consequently providing a phase-shift $2p$, phase-shifters P' and P'' providing a common phase-shift $p'$, which may have any value, horn CV collects the vertically polarized component of the jamming signals and horn CH the horizontally polarized component of the same signals. Of course one of these two components may be zero, if the jammer transmits a linearly polarized wave. The signals collected by horns CV and CH are respectively transmitted by duplexers D1 and D2 to the two input branches of junction J4. The phase-shift between the signals respectively collected by horns CV and CH depends on the polarization mode of the jammer. The signals collected by horn CV are phase-shifted by $p$ in phase-shifter P1 and those collected by horn CH by $2p$ in phase-shifter P2. In this way, an additional phase-shift $p$ is imparted to the latter signals relatively to the former in the course of their propagation between the horns and the input branches of junction J4.

Thus the input signals of the two input branches of junction J4 may have any amplitudes and relative phase-shift. These signals are distributed in any manner between the output branches of junction J4, and later between those of junction J3, and receivers Rb and Rr, each of which will generally receive a part of the signals received by both horns CH and CV.

The space is scanned in the usual manner by the antenna arrangement comprising horns CV and CH, so as to determine the direction corresponding to a maximum reception of the jamming signals. This maximum reception is preferably observed by means of an auxiliary indicator (not shown) which receives the sum of the video signals of receivers R$b$ and R$r$. The antenna being maintained in the same direction, the operator adjusts the phase-shifters P1 and P2 so as to put in phase or in phase opposition the signals of the two input branches of junction J4. The equality or the opposition of these phases may be determined by means of a differential measure of the phases between the two input branches of junction J4, but it is more convenient to check the equality of the amplitudes of the signals at the two output branches of junction J3, which amplitude equality is the desired result. As is known, the 3 db hybrid junctions have the property that, if two signals of the same phase or in phase opposition and of any amplitude are respectively applied onto their two input branches, the signals respectively collected at their two output branches have equal amplitudes, the reciprocal being also true.

The above amplitude measurement is effected by means of probes or detectors S1 and S2, the output signals of which are applied to the two inputs of the differential amplifier A, which may feed, for example, a pointer type indicator.

The operator then adjusts phase-shafters P1 and P2 to bring phase-shift $p$ to the value required for making the indication provided by indicator I equal to zero.

At this instant the signals applied to the two input branches of junction J3 have equal amplitudes and their relative phase-shift is a function of the ratio of the amplitudes of the input signals of junction J4.

According to another known property of 3 db hybrid junctions, when two signals of equal amplitude and phase-shifted by $\pi/2$ with respect to each other are applied onto their input branches, all the energy appears at the output branch located in the prolongation of the input branch where the propagating signal lags by $\pi/2$ with respect to the signal in the other branch. The operator adjusts now the phase-shifters P' and P'' to delay by $\pi/2$ the signal propagating in that input branch of junction J3 which is the prolongation of the branch connected to the jammer receiver R$b$. This adjustment may be effected by observing the minimum reception on the indicator of the receiver R$r$ or the maximum reception on that of receiver R$b$.

It should be noted that if the jammer transmits only linearly polarized signals, i.e., either horizontally or vertically, only one input branch of junction J4 is fed and this junction delivers at its two output branches respective signals of equal amplitude and phase-shifted by $\pi/2$ with respect to each other, whatever the value $p$ of the phase-shift impressed by phase-shifter P1. In this case, the value $p'$ of the phase-shift imparted by phase-shifter P'', should be equal to 0 or to $\pi$, as the case may be. The whole of the energy is then fed to the jamming receiver R$b$.

Once these adjustments are effected, the antenna system is being pointed, at least approximately, in the direction of the jammer and theoretically all the jamming signals, and practically substantially all of them, are being switched to receiver R$b$. The transmitter is then put into operation and feeds the two transmission-reception channels, the matched load L absorbing the energy portion which might for any reason propagate in the corresponding branch.

It should be noted that in adjusting the phase-shifter P'' to provide a phase-shift $p'$, the operator has also adjusted phase-shifter P' to provide the same phase-shift. The antenna being pointed, at least approximately, in the direction of the jammer, and since horns CH and CV are located at a distance from each other which is small compared to the distance therefrom to the jammer, the signals collected by the horns as echoes are phase-shifted with respect to each other by substantially the same phase-shift as at the moment of their transmission, provided their impact on the jammer carrier phase shifts both of them by the same angle. It will be assumed that this condition is satisfied.

It will now be shown, applying the principle of reciprocity for mediums without losses, that, in this case, the radar signals received as echoes are switched to the detector receiver R$r$.

Disregarding first the action of phase-shifters P1 and P2, the electric length of the sum of the paths, "the upper output branch of junction J2, duplexer D1, horn CV" and "horn CV, duplexer D1, upper input branch of junction J4" is equal to the electrical distance corresponding to the sum of the paths "lower output branch of junction J2, duplexer D2, horn CH" and "horn CH, duplexer D2 lower input branch of distance J4." To the first one of these two sums, phase-shift $p$ is to be added twice, since the radar signals of the vertical polarization path propagate twice through the phase-shifter P1, once on their way out and once on their way back. To the second sum, phase-shift $2p$ is to be added once, since the signals of the horizontal polarization path propagate once through phase-shifter P2, on their way back.

It follows that, under the assumption made hereinabove, reflection of the radar pulses on the jammer impresses the same phase-shift on the vertically polarized pulses and the horizontally polarized pulses, the phase-shift between the two radar signals at the two input branches of junction J4 is the same as between the signals at the two output branches of junction J2. The ratio of the amplitudes of those signals will also be substantially the same. The arrangement comprising junctions J4 and J3 and phase-shifter P'' provides the same phase-shift as the arrangement comprising junctions J1 and J2 and phase-shifter P'. According to the reciprocity principle and since the energy was applied to the lower branch of junction J1, practically all the energy of the radar signals will be collected at the lower branch of junction J3, i.e., by receiver R$r$. Only a negligible energy portion, i.e., that corresponding to the energy absorbed by load L, will propagate towards receiver R$b$.

In fact, the reflection of the radar signals on the jammer will generally result in different phase-shifts for horizontally and vertically polarized signals.

Also the relative amplitudes may be slightly modified and losses may occur. Accordingly, the conditions of the application of the reciprocity principle for a medium without losses are not strictly satisfied. However, the major part of the radar echo energy received will be picked up by receiver R$r$, while the jamming signals will not. The measurement of the distance from the radar system to the jammer does not require that the total amount of energy of the radar should be collected by the receiver and may be effected in the conventional manner.

For a better measuring, a known method may be used. Video signals may be integrated, for example, by pulse modulating by echoes at the video level an oscillator, the output signal of which propagates through an ultrasonic delay device, which impresses thereon a delay equal to the transmission period of the radar pulses. The pulses at the output of the delay device are added to the video signals modulating the oscillator, until a signal of a sufficient amplitude is obtained at the output of the ultrasonic line.

Once the radar pulses have been separated from the jamming signals, the direction of the jammer may be more accurately determined.

The radar system according to the invention also makes possible the detection and the location of targets, whether they are located or not in the same direction as the jammer.

It is to be noted that the question of switching the jamming signals to receiver R$b$ arises only if the antenna is directed in such a manner that it will pick-up a substantial amount of jamming signals. However, the switching of the jamming signals to the receiver R$b$ is effected exactly in the same way, whether the antenna is directed exactly towards the jammer or not, i.e. by adjusting the phase-shifts $p$ and $p'$.

The detection of targets, located in the same direction with respect to the radar system as the jammer, is thus effected by means of the adjusting of phase-shifts $p$ and $p'$.

When detecting such a target, the antenna being pointed towards the target, the portion of the echo energy received from this target and switched to the detection receiver R$r$ will depend upon the same factors, such as, for example, the phase-shifts due to the reflection as in the case of the echo energy received from the jammer when the antenna is pointed towards the jammer. It will be, as a rule, sufficient for ensuring a correct location of the target.

As regards the detection of the targets which do not lie in the same direction as the jammer, it will be advantageously effected with a predetermined adjustment of phase-shifts $p$ and $p'$, corresponding to polarization desired for the transmission, the phase-shift $p'$ affecting the relative amplitudes of the waves transmitted by the two channels, and the phase-shift $p$ affecting their relative phase-shift at the transmission.

The desired information may be obtained from the auxiliary indicator mentioned above which receives the sum of the video signals of the two receivers.

Of course, the invention is not limited to the embodiment described and illustrated.

In particular, a system according to the invention may be used with different antenna arrangements, for example, a monopulse antenna, such as that used in the French Patent No. 1,085,146, issued on an application filed by the applicant June 20, 1953. This antenna arrangement comprises a non polarizing reflector associated with four sources built up by the mouths of four wave guides, arranged in such a manner that their respective large sides build up a square. Two sources provide a vertical polarization, and two a horizontal polarization, each pair of sources being connected to one single wave guide.

The source of interfering signals to be detected is not necessarily a jammer but may be also a source of signals which accidentally affected the operation of the radar system.

The only condition necessary for a correct operation of the system according to the invention is that the polarization direction of the interfering or jamming signals is not modified at too fast a rate.

Actually, this condition is generally satisfied.

Of course, phase-shifters P1 and P2 may be arranged in any other manner providing the same result. For example, phase-shifter P1 may be inserted before duplexer D1 instead of being inserted after it, in which case phase-shifter P2 would have to provide the same phase-shift or phase-shift P1 instead of providing twice this phase-shift. The essential feature is that the relative phase of the jamming signals at the output of the two receiving channels should be adjustable while leaving unaffected the relative phase between the radar signals as it appeared at the input of the transmitting channels.

What is claimed is:

1. A switching arrangement for radar systems comprising a first and a second transmitting and receiving channel having respective inputs and outputs; a first energy distributing means having two inputs and two outputs respectively coupled to said inputs of said channels; means for coupling a transmitter to one of said last mentioned inputs; a second energy distributing means having two inputs, respectively coupled to said outputs of said channels, and two outputs; means for coupling said last mentioned outputs to respective receivers; and means for adjusting the relative phase-shift between the respective output signals of said channels other than those applied to said inputs of said channels.

2. A switching system for radar systems comprising: a first transmitting and receiving channel and a second transmitting and receiving channel, having respective inputs and outputs; first wave guide means including two 3 db hybrid junctions, in prolongation of each other, and having an input and two outputs, respectively coupled to said inputs of said first and second channels; means for coupling a transmitter to said input of said first wave guide means; second wave guide means, identical to said first wave guide means and including two 3 db hybrid junctions in prolongation of each other and having two inputs respectively coupled to said outputs of said channels, and two outputs; means for coupling said outputs of said second wave guide means to respective receivers; and means for adjusting the relative phase-shift between the respective output signals of said channels other than those applied to said inputs of said channels.

3. A switching arrangement for radar systems comprising: a first transmitting-receiving channel for waves linearly polarized in a first direction, said first channel having an input and an output; a second transmitting-receiving channel for waves linearly polarized in a second direction, perpendicular to said first direction, said second channel having an input and an output; a first energy distributing means comprising a first and a second hybrid junction having respectively two input and two output branches, the output branches of said first junction being respectively coupled to said input branches of said second junction; means for coupling one of said input branches of said first junction to a transmitter; said output branches of said second junction being respectively coupled to said inputs of said channels; a second energy distributing means comprising a third and a fourth hybrid junction, having respectively two input and two output branches, the output branches of said fourth junction being respectively coupled to the input branches of said third junction; the input branches of said fourth junction being respectively coupled to the two outputs of said first and second channels; means for respectively coupling two receivers to the output branches of said third junction; and means for adjusting the relative phase-shift between the respective output signal of said channels, other than those applied to said inputs of said channels.

4. A radar system comprising: a transmitter; a first transmitting-receiving channel for waves linearly polarized in a first direction, said first channel having an input and an output; a second transmitting-receiving channel for waves linearly polarized in a second direction perpendicular to said first direction, said second channel having an input and an output; a first energy distributing means comprising a first and a second hybrid junction having respectively two input and two output branches, the output branches of said first junction being respectively coupled to said input branches of said second junction; means for coupling one of said input branches of said first junction to said transmitter; said output branches of said second junction being respectively coupled to said inputs of said channels; a first variable phase-shifter inserted between said first and second hybrid junctions; a second energy distributing means comprising a third and a fourth hybrid junction, having respectively two input and two output branches; the output branches of said fourth junction being respectively coupled to the input branches of said third junction, the input branches of said fourth junction being respectively coupled to the two outputs of said first and second channels, a second variable phase-shifter inserted between said fourth and third junctions, said second phase-shifter being identical to and ganged with said first phase-shifter; two receivers respectively coupled to the output branches of said third junction; and means for adjusting the relative phase-shift between the respective output signals of said channels for signals other than those applied to said inputs of said channels.

5. A switching arrangement for radar systems comprising: a first transmitting-receiving channel for waves linearly polarized in a first direction, said first channel having an input and an output; a second transmitting-receiving channel for waves linearly polarized in a second direction perpendicular to said first direction, said second channel having an input and an output; a first energy distributing means comprising a first and a second hybrid junction having respectively two input and two output branches, the output branches of said first junction being respectively coupled to said input branches of said second junction; means for coupling one of said input branches of said first junction to a transmitter; said output branches of said second junction being respectively coupled to said inputs of said channels; a second energy distributing means comprising a third and a fourth hybrid junction having respectively two input and two output branches; the output branches of said fourth junction being respectively coupled to the input branches of said third junction, the input branches of said fourth junction being respectively coupled to the two outputs of said first and second channels; two receivers respectively coupled to the output branches of said third junction; respective variable phase-shifting means in said channels for adjusting to a predetermined value the relative phase at the outputs of said channels of signals other than those applied to the inputs of said channels, without affecting the relative phase of the signals applied to the inputs of said channels; variable phase-shifting means between said fourth and third junctions for directing said signals having said predetermined relative phase-shift at the output of said channels towards one of said output branches of said third junction; and further variable phase-shifting means identical to and ganged with said last mentioned phase-shifting means between said first and second junctions.

6. A radar system comprising: a transmitter; a first transmitting-receiving channel for waves linearly polarized in a first direction, said first channel having an input and an output and including a first duplexer; a second transmitting receiving channel for waves linearly polarized in a second direction, perpendicular to said first direction, said second channel having an input and an output and including a second duplexer; first energy distributing means comprising a first and a second hybrid junction having respectively two input and two output branches, the output branches of said first junction being respectively coupled to said input branches of said second junction; means for coupling one of said input branches of said first junction to said transmitter, said output branches of said second junction being respectively coupled to said inputs of said channels; second energy distributing means comprising a third and a fourth hybrid junction, having respectively two input and two output branches; the output branches of said fourth junction being respectively coupled to the input branches of said third junction, the input branches of said fourth junction being respectively coupled to the two outputs of said first and second channels; two receivers respectively coupled to the output branches of said third junction; respective variable phase-shifting means in said channels for adjusting to a predetermined value the relative phase-shift at the outputs of said channels of signals other than radar signals without affecting the relative phases of radar signals; said last mentioned means comprising a first phase-shifting device inserted in said first channel, a second phase-shifting device inserted between the duplexer and the output of said second channel, said second device being ganged with said first device; variable phase-shifting means between said fourth and third junctions for directing said signals having said predetermined relative phase-shift at the output of said channels towards one of said output branches of said third junction; and further variable phase-shifting means identical to and ganged with said last mentioned phase-shifting means, between said first and second junctions.

References Cited by the Examiner
UNITED STATES PATENTS

| | | | |
|---|---|---|---|
| 2,175,270 | 10/1939 | Koch | 343—100.3 |
| 3,044,062 | 7/1962 | Katzin | 343—100.3 |

CHESTER L. JUSTUS, *Primary Examiner.*